(12) United States Patent
Hsieh et al.

(10) Patent No.: US 7,899,310 B2
(45) Date of Patent: Mar. 1, 2011

(54) DOCUMENT SNAPSHOT DEVICE

(75) Inventors: Yun-Liang Hsieh, Tao Yuan Shien (TW); Wen-Ji Tsai, Taipei Shien (TW); Jung-Wen Chang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 190 days.

(21) Appl. No.: 12/292,239

(22) Filed: Nov. 14, 2008

(65) Prior Publication Data

US 2010/0054721 A1 Mar. 4, 2010

(30) Foreign Application Priority Data

Sep. 4, 2008 (TW) .............................. 97215983 U (51) Int. Cl.
*G03B 17/00* (2006.01)
(52) U.S. Cl. ............................................ 396/5; 396/428
(58) Field of Classification Search .............. 396/5, 428; 348/373, 376; 355/18
See application file for complete search history.

(56) References Cited

U.S. PATENT DOCUMENTS

| 5,374,971 | A * | 12/1994 | Clapp et al. | 348/376 |
| 6,008,846 | A * | 12/1999 | Uehara et al. | 348/373 |
| 6,115,068 | A * | 9/2000 | Ariga et al. | 348/373 |
| 7,409,147 | B2 * | 8/2008 | Yi et al. | 396/4 |
| 7,626,634 | B2 * | 12/2009 | Ohki et al. | 348/373 |
| 2007/0035655 | A1 * | 2/2007 | Chen et al. | 348/373 |

* cited by examiner

*Primary Examiner* — W. B. Perkey
(74) *Attorney, Agent, or Firm* — Rabin & Berdo, PC (57) ABSTRACT

A document snapshot device is provided. The document snapshot device comprises a baseboard, a camera and a foldable supporting means. The baseboard comprises a central area to place a document and a connecting chamfer. The camera comprises a pivot. The foldable supporting means comprises a first supporting means connecting the connecting chamfers, a second supporting means connecting the pivot of the camera and a third supporting means connecting the first and the second supporting means. The first, second and third supporting means can stretch along a first plane to form a first angle between the first and the third supporting means and a second angle between the second and the third supporting means. The camera can rotate along a second plane with the pivot to form a third angle relative to a stretching direction from the second supporting means to the camera to aim at the document to take a snapshot.

16 Claims, 8 Drawing Sheets

DOCUMENT SNAPSHOT DEVICE

RELATED APPLICATIONS

This application claims priority to Taiwan Application Serial Number 97215983, filed Sep. 4, 2008, which is herein incorporated by reference.

BACKGROUND

1. Field of Invention

The present invention relates to a document snapshot device. More particularly, the present invention relates to a document snapshot device comprising a foldable supporting means.

2. Description of Related Art

Due to the popularity of the computers and the networks, data transmission is easy. In order to transmit the documents and pictures, especially the hand written documents and the hand drawn pictures, a digitalization process is needed.

Common ways to digitalize the documents and pictures are to scan the documents and pictures with a scanner or to take a snapshot of the documents and pictures with a camera. When using a camera to take a snapshot of the documents or pictures, it's easy to shake the camera if the user doesn't hold the camera steadily. The vibration usually makes the digitalized documents and pictures unclear, which is an undesired result. Besides, the user may not precisely aim the camera at the documents and the pictures and will miss some parts of the documents and the pictures.

Accordingly, what is needed is a document snapshot device to make the camera precisely aim at the documents and avoid the vibration of the camera. The present invention addresses such a need.

SUMMARY

A document snapshot device is provided. The document snapshot device comprises: a baseboard, a camera and a foldable supporting means. The baseboard comprises a central area to place a document and a connecting chamfer on a corner of the baseboard. The camera comprises a pivot. And the foldable supporting means comprises: a first supporting means connecting to the connecting chamfers, a second supporting means connecting to the pivot of the camera and a third supporting means connecting to the first and the second supporting means, wherein the first, second and third supporting means stretch along a first plane to form a first angle between the first and the third supporting means and a second angle between the second and the third supporting means, and the camera rotates along a second plane with the pivot to form a third angle relative to a stretching direction from the second supporting means to the camera to aim at the document to take a snapshot.

Another object of the present invention is to provide a document snapshot device comprising: a document-positioning base, a camera and a foldable supporting means. The document-positioning base comprises a positioning pivot, two positioning rotation means and a connecting pivot. The two positioning rotation means connect to a side of the positioning pivot to perform a rotation relative to the positioning pivot on a first plane to form a central area between the two positioning rotation means to place and position a document. The connecting pivot is formed on a side of the positioning pivot opposite to the two positioning rotation means. The camera comprises a pivot. And the foldable supporting means comprises: a first supporting means connecting to the connecting pivot to perform a rotation to form a first angle between the first supporting means and the first plane, a second supporting means connecting to the pivot of the camera; and a third supporting means connecting to the first and the second supporting means; wherein the first, second and third supporting means stretch along a second plane to form a second angle between the first and the third supporting means and a third angle between the second and the third supporting means, and the camera rotates along a third plane with the pivot to form a fourth angle relative to a stretching direction from the second supporting means to the camera to aim at the document to take a snapshot.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
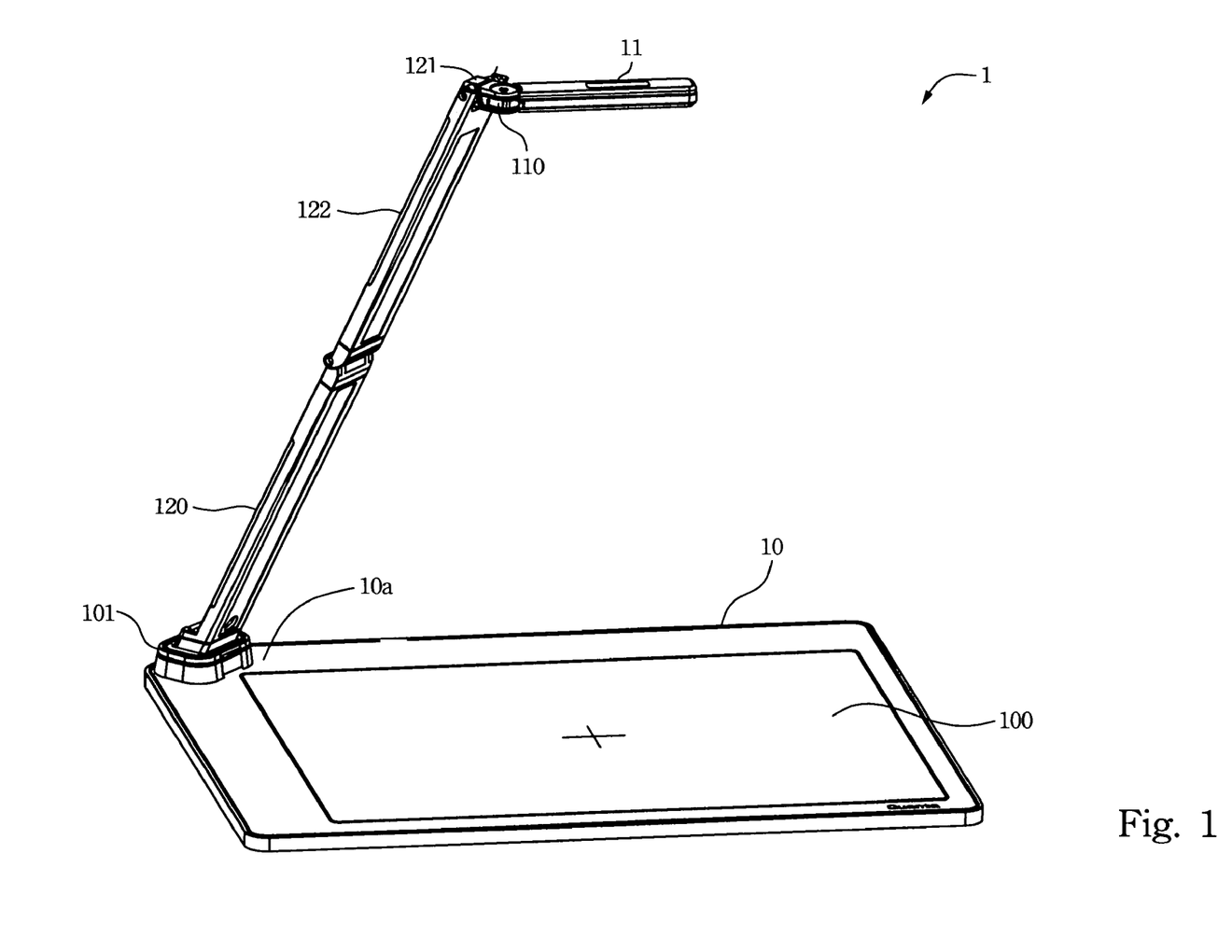
FIG. 1 is a 3-D diagram of a document snapshot device 1 of the first embodiment of the present invention.

Please refer to FIG. 1, a 3-D diagram of a document snapshot device 1 of the first embodiment of the present invention. The document snapshot device 1 comprises: a baseboard 10, a camera 11 and a foldable supporting means 12. The baseboard comprises a central area 100 and a connecting chamfer 101. The central area 100 is to place a document (not shown). Through the central area 100 and the foldable supporting means 12, the camera 11 can precisely aim at the document. The connecting chamfer 101 is formed on a corner 10a of the baseboard 10. The camera 11 comprises a pivot 110. The foldable supporting means 12 comprises: a first supporting means 120 connecting to the connecting chamfers 101, a second supporting means 121 connecting to the pivot 110 of the camera 11 and a third supporting means 122 connecting to the first and the second supporting means 120 and 121.

Figure 2A:
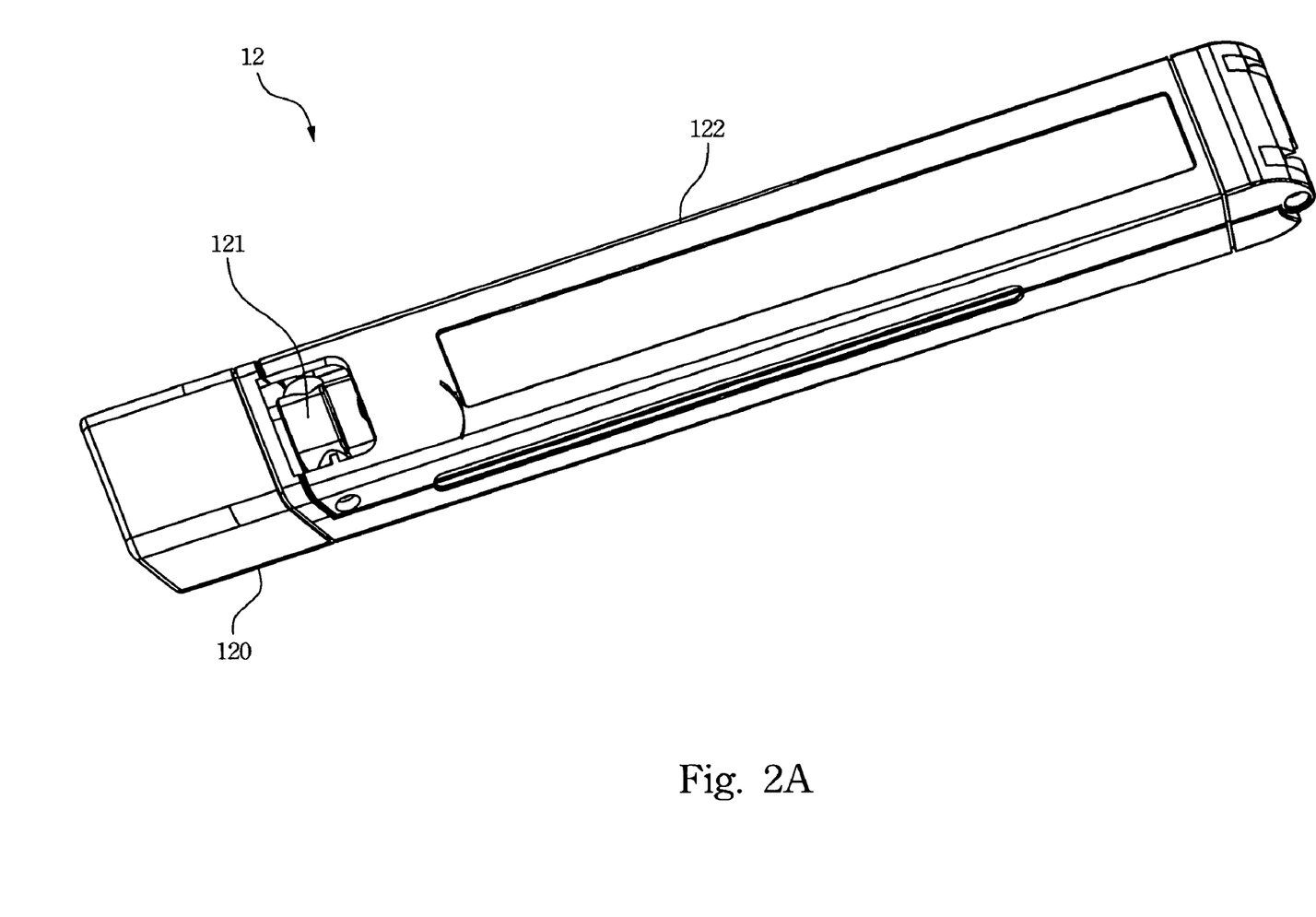
FIG. 2A is a 3-D diagram of the foldable supporting means and the camera.
Figure 2B:
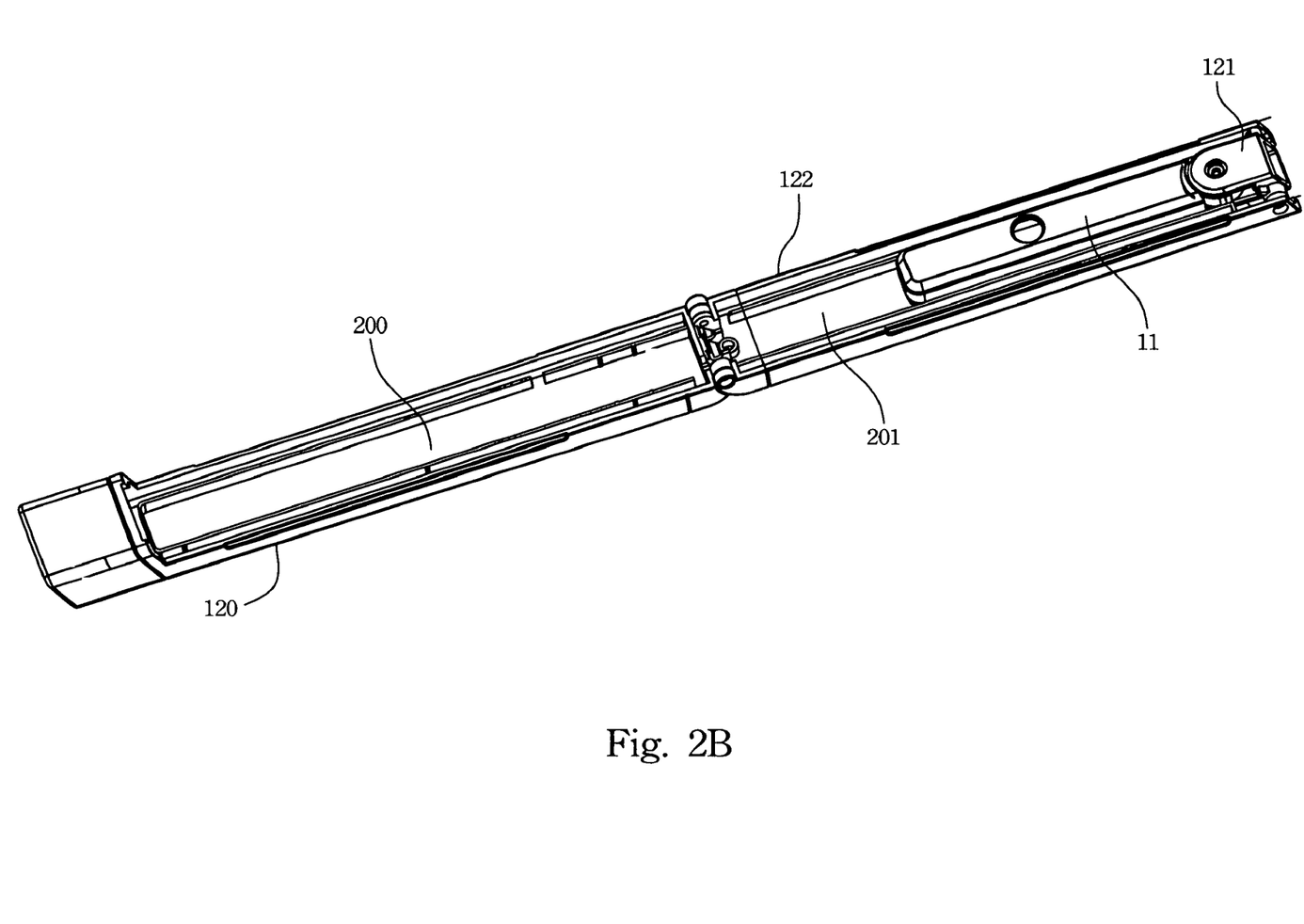
FIG. 2B is another 3-D diagram of the foldable supporting means and the camera.
Figure 2C:
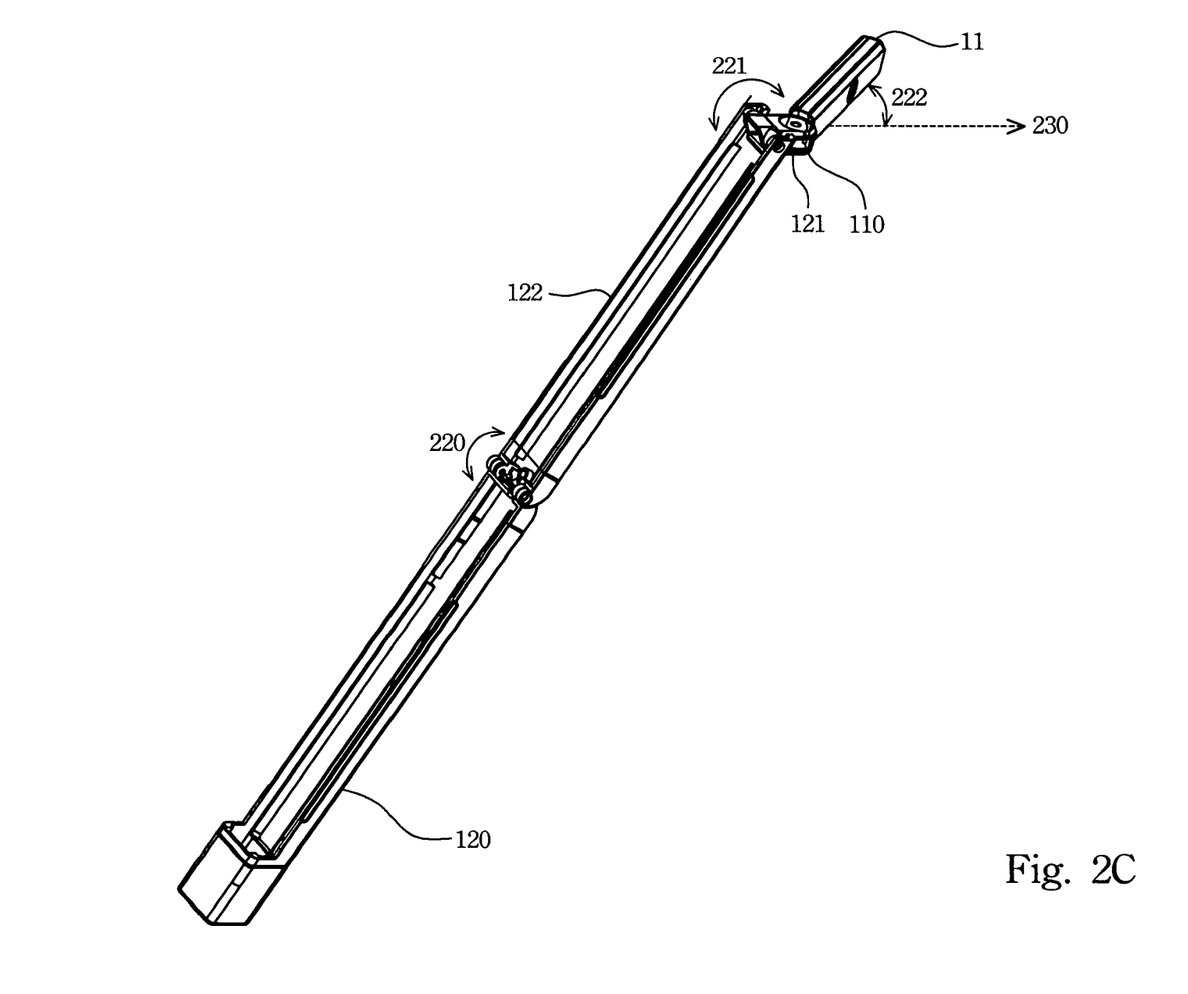
FIG. 2C is another 3-D diagram of the foldable supporting means and the camera.

FIG. 2A is a 3-D diagram of the foldable supporting means 12 and the camera 11, wherein the foldable supporting means 12 and the camera 11 are folded together. Please refer to FIG. 2B at the same time, which is another 3-D diagram of the foldable supporting means 12 and the camera 11. In FIG. 2B, the first and third supporting means 120 and 122 are unfolded, and an angle of 180 degrees is formed between them. The second supporting means 121 and the camera 11 are still folded. According to the FIG. 2B, the first and third supporting means 120, 122 have a cavity 200 and 201, respectively. When the first, second and third supporting means 120, 121, 122 are folded as depicted in FIG. 2A, the cavity 200 and 201 together form a containing space between the first and the third supporting means 120, 122 to contain the second supporting means 121 and the camera 11. FIG. 2C is a 3-D diagram showing that the first, second and third supporting means 120, 121, 122 are all unfolded. The first, second and third supporting means 120, 121, 122 stretch along a first plane to form a first angle 220 between the first and the third supporting means 120, 122 and a second angle 221 between the second and the third supporting means 121, 122. With the pivot 110, the camera rotates along a second plane to form a third angle 222 relative to a stretching direction 230 from the second supporting means 121. When the foldable supporting means 12 stretches to make the first angle 220 as 180 degrees, the second angle 221 as 245 degrees, the second plane is parallel to the baseboard 10. Further, when the third angle 222 is 46 degrees relative to the left side of the stretching direction 230, the camera 11 precisely aims at the document in the central area 100 to take the snapshot, as depicted in FIG. 1.

Figure 3:
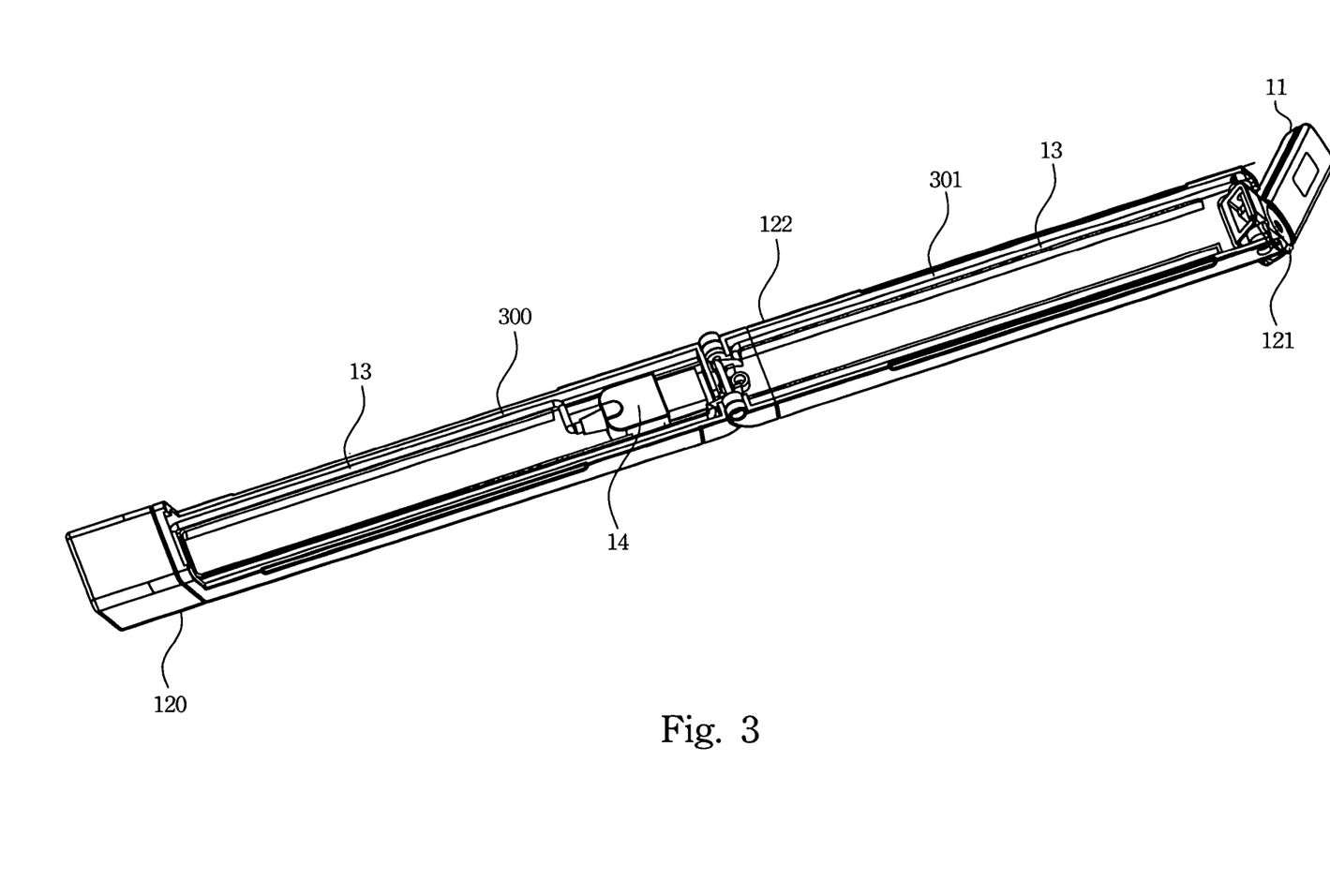
FIG. 3 is a top view of the foldable supporting means and camera.

FIG. 3 is a top view of the foldable supporting means 12 and camera 11, wherein the foldable supporting means 12 and camera 11 are unfolded. The document snapshot device 1 further comprises a cable 13 and a plug 14 for data transmission, wherein the plug 14 is connected to the camera 11 through the cable 13. The plug 14 in the present embodiment is a USB plug used to transmit the snapshot data of the camera 11 to a host (not shown) through the cable 13 and the plug 14. Besides the cavity 200 and 201 described above, the first and third supporting means 120, 122 further comprise a first and a second trench 300, 301, respectively, to contain the cable 13 and the plug 14.

Figure 4:
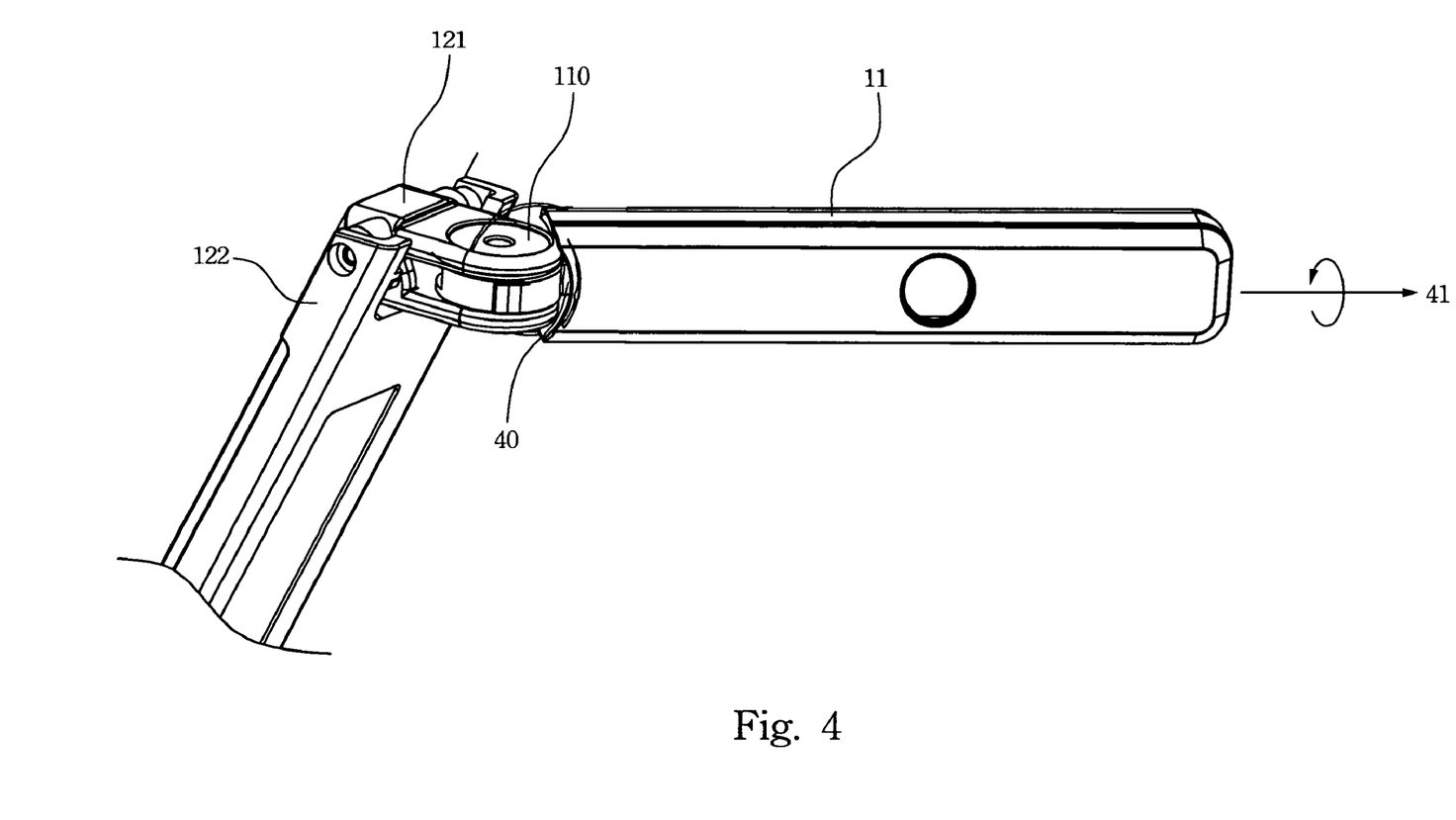
FIG. 4 is a 3-D diagram of the camera and the second supporting means.

FIG. 4 is a 3-D diagram of the camera 11 and the second supporting means 121 in another embodiment of the present invention. In the present embodiment, the second supporting means 121 further comprises a rotating pivot 40 connecting to the pivot 110 of the camera 11, the camera 11 performs a rotation with the rotating pivot 40, wherein the stretching direction of the camera 11 acts as the axis of the rotation.

Figure 5A:
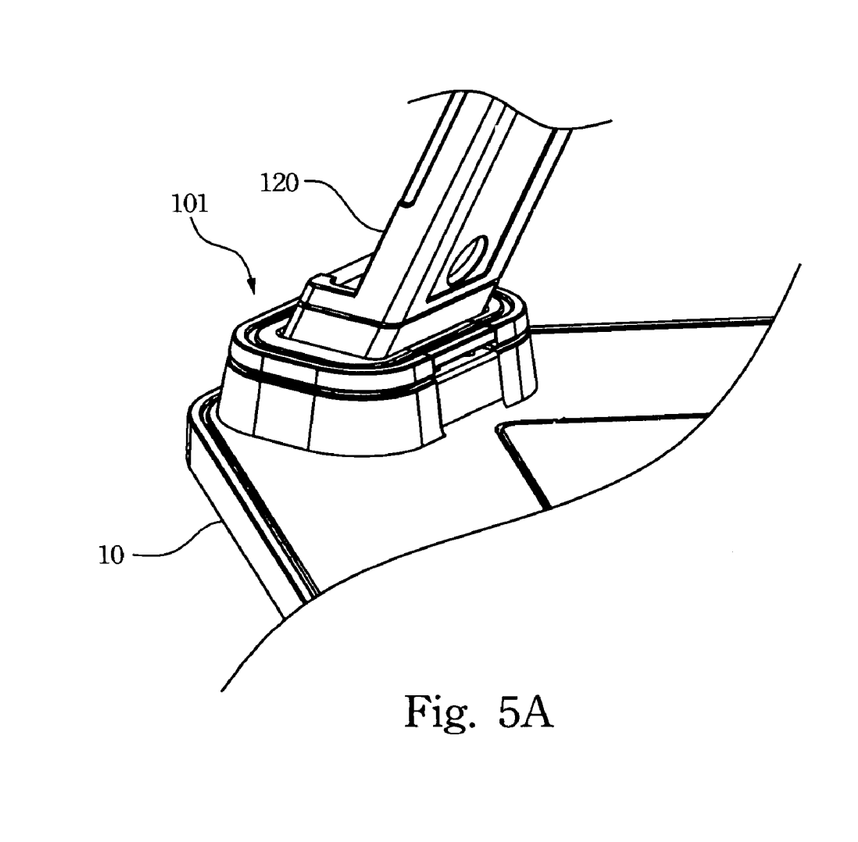
FIG. 5A is a partial enlarged view of the first supporting means and the connecting chamfer.

FIG. 5A is a partial enlarged view of the first supporting means 102 and the connecting chamfer 101. Please refer the FIG. 5B at the same time, a 3-D perspective view of the first supporting means 102 and the connecting chamfer 101 along the A direction in FIG. 5A. The first supporting means 120 comprises a side hole 50. The connecting chamfer 101 further comprises: a containing hole 51, a first springboard 52 and a second springboard 53. The first springboard 52, which comprises a bulge 520 on a first side 521 of the first springboard 52, is placed on a side of the containing hole 51. The second springboard 53 is placed on a second side 522 of the first springboard 52 to support the first springboard 52. It's noticed that, in other embodiment, the second springboard 53 is not necessary. The containing hole 51 allows the first supporting means 120 wedging in the containing hole 51. When the first supporting means 120 is about to enter the containing hole 51, a pushing force is performed on the first and second springboards 52, 53. Therefore, the first and second springboards 52, 53 are bended to let the first supporting means 120 enter the containing hole 51. When the bulge 520 embeds in the side hole 50 on the first supporting means 120, the first supporting means 120 completely wedges in the side hole 50 tightly.

Figure 5B:
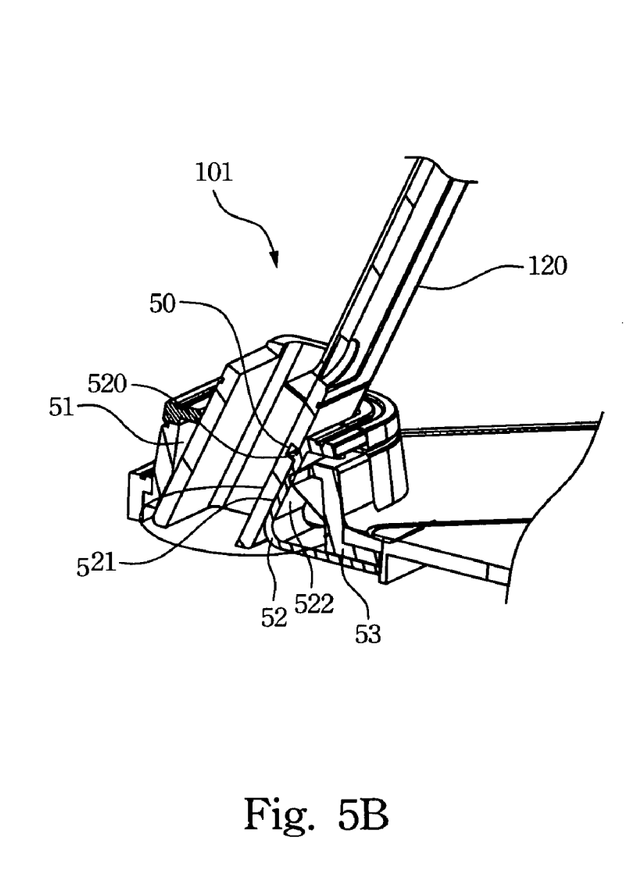
FIG. 5B is a 3-D perspective view of the first supporting means and the connecting chamfer along the A direction in FIG. 5A.

When the first supporting means 120 wedges in the side hole 50, a pushing force performed on the first and second springboards 52, 53 can bend the first and second springboards 52, 53 to make the bulge 520 depart from the side hole 50 and further make the first supporting means 120 departs from the containing hole 51. In the present embodiment, the first springboard 52 is plastic and the second springboard 53 is metal, while in other embodiment the first and second springboards 52, 53 may be formed with other material.

Figure 6A:
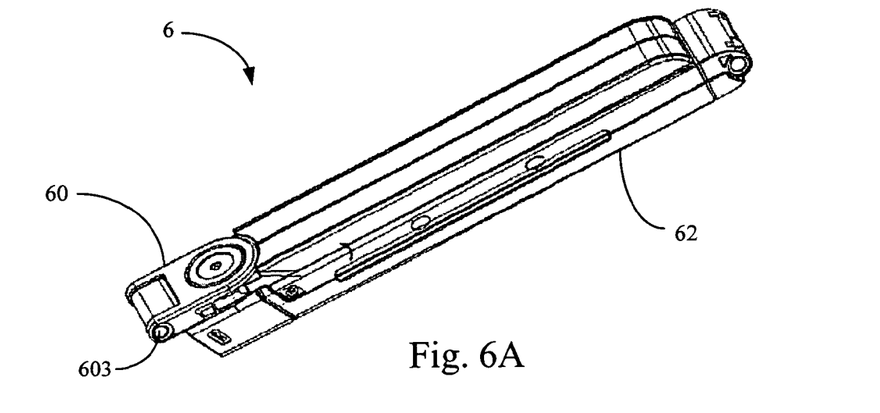
FIG. 6A is a 3-D diagram of a document snapshot device of the second embodiment of the present invention.
Figure 6B:
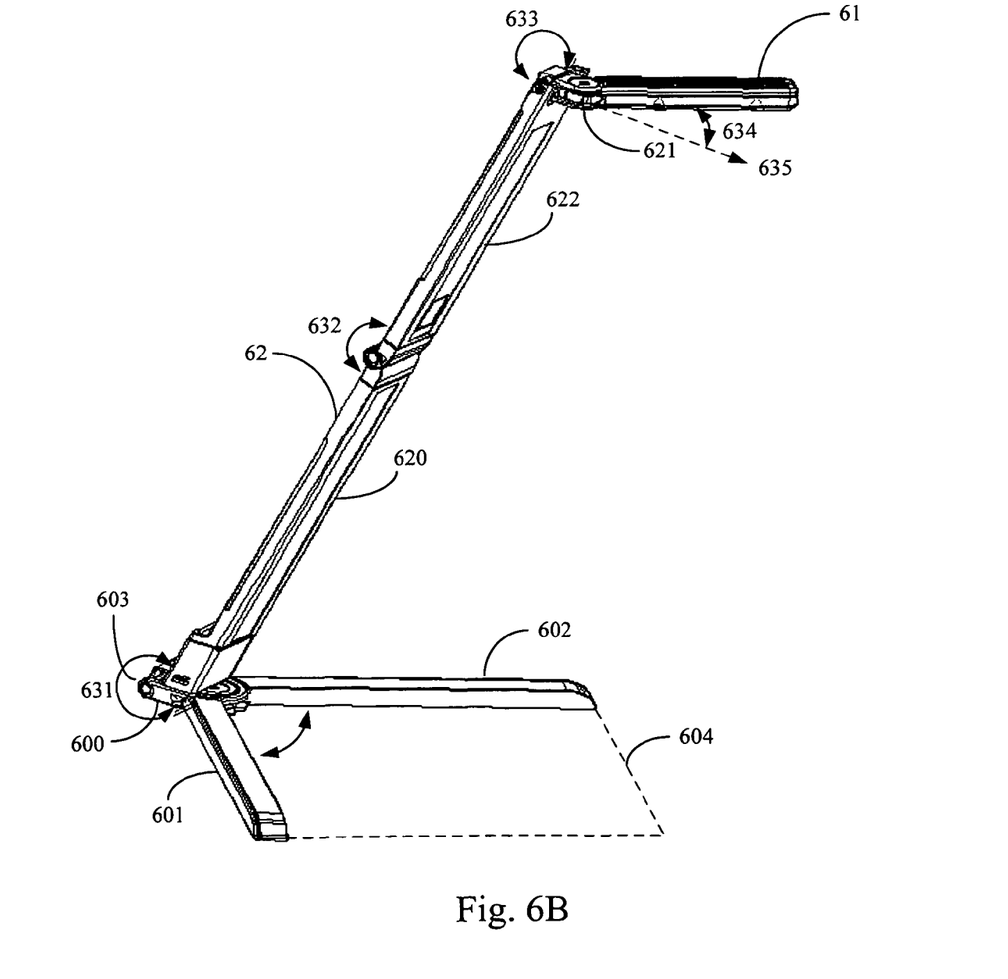
FIG. 6B is another 3-D diagram of a document snapshot device of the second embodiment of the present invention.

FIG. 6A is a 3-D diagram of a document snapshot device 6 of the second embodiment of the present invention. The document snapshot device 6 comprises: a document-positioning base 60, a camera 61 and a foldable supporting means 62. In the present embodiment, the foldable supporting means 62 comprises a first supporting means 620, a second supporting means 621 and a third supporting means 622. The connection of the first, second, third supporting means 620, 621, 622 and the camera 61 is the same as the first embodiment. The major difference between the first and the second embodiment is the document-positioning base 60 in the second embodiment. Please refer to FIG. 6B at the same time, the document-positioning base 60 comprises a positioning pivot 600, two positioning rotation means 601, 602 and a connecting pivot 603. The two positioning rotation means 601, 602 connect to a side of the positioning pivot 600 to perform a rotation relative to the positioning pivot 600 on a first plane to form a central area 604 between the two positioning rotation means 601, 602 to place and position a document (not shown). The connecting pivot 603 is formed on a side of the positioning pivot 600 opposite to the two positioning rotation means 601, 602. The first supporting means 620 of the foldable supporting means 62 connects to the connecting pivot 603 and forms a first angle 631 between the first supporting means 620 and the first plane. In one embodiment, when the foldable supporting means 62 stretches to make the first angle 631 as 295 degrees, the second angle 632 between the first and third supporting means 620, 622 as 180 degrees, the third angle 633 between the second and third supporting means 621, 622 as 245 degrees, the fourth angle 634 relative to the left side of the stretching direction 635 from the second supporting means 621 to the camera 61 as 46 degrees, the camera 61 precisely aims at the document in the central area 604 to take the snapshot, as depicted in FIG. 6B.

The document-positioning base and the two positioning rotation means of the second embodiment are an alternative form of the baseboard of the first embodiment to place the document. The document-positioning base and the two positioning rotation means can further fold together with the foldable supporting means and the camera to accomplish the convenience.

According to the embodiments disclosed above, through the use of the document snapshot device, the camera can precisely aim at the document in the central area and the foldable supporting means can provide a steady supporting mechanism to avoid the vibration of the camera. Further, the cable and the plug can be contained in the trenches on the foldable supporting means to provide the function of data transmission.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A document snapshot device comprising:
a baseboard comprising:
a central area to place a document; and
a connecting chamfer on a corner of the baseboard;
a camera comprising a pivot; and
a foldable supporting means comprising:
a first supporting means connecting to the connecting chamfer;
a second supporting means connecting to the pivot of the camera; and
a third supporting means connecting to the first and the second supporting means such that when the first, second and third supporting means are folded, a containing space is formed between the first and the third supporting means to contain the second supporting means and the camera;
wherein the first, second and third supporting means stretch along a first plane to form a first angle between the first and the third supporting means and a second angle between the second and the third supporting means, and the camera rotates along a second plane with the pivot to form a third angle relative to a stretching direction from the second supporting means to the camera to aim at the document to take a snapshot.

2. The document snapshot device of claim 1, when the first angle is 180 degrees and the second angle is 245 degrees, the second plane is parallel to the baseboard.

3. The document snapshot device of claim 2, when the third angle is 46 degrees relative to the left side of the stretching direction, the camera precisely aims at the document in the central area.

4. The document snapshot device of claim 1, further comprising a cable and a plug for data transmission, wherein the plug is connected to the camera through the cable.

5. The document snapshot device of claim 4, wherein the first and the third supporting means further comprise a first and a second trench respectively to contain the cable and the plug.

6. A document snapshot device, comprising:
a baseboard comprising:
a central area to place a document; and
a connecting chamfer on a corner of the baseboard;
a camera comprising a pivot; and
a foldable supporting means comprising:
a first supporting means connecting to the connecting chamfer, the first supporting means further comprises a side hole,
a second supporting means connecting to the pivot of the camera; and
a third supporting means connecting to the first and the second supporting means;
wherein the first, second and third supporting means stretch along a first plane to form a first angle between the first and the third supporting means and a second angle between the second and the third supporting means, and the camera rotates along a second plane with the pivot to form a third angle relative to a stretching direction from the second supporting means to the camera to aim at the document to take a snapshot; and
wherein the connecting chamfer further comprises:
a containing hole to allow the first supporting means wedging in the containing hole; and
a first springboard placed on a side of the containing hole, wherein the first springboard comprises a bulge formed on a first side of the first springboard;
when the first supporting means wedges in the containing hole, the bulge embeds in the side hole to make the first supporting means wedges in the containing hole tightly, and when a pushing force is performed on the first springboard, the first supporting means departs from the containing hole.

7. The document snapshot device of claim 6, wherein the connecting chamfer further comprises a second springboard placed on a second side of the first springboard to support the first springboard.

8. The document snapshot device of claim 7, wherein the first springboard is plastic and the second springboard is metal.

9. The document snapshot device of claim 1, the second supporting means further comprises a rotating pivot connecting to the pivot of the camera, the camera performs a rotation with the rotating pivot, wherein the stretching direction of the camera acts as the axis of the rotation.

10. A document snapshot device comprising:
a document-positioning base comprising:
a positioning pivot;
two positioning rotation means connecting to a side of the positioning pivot to perform a rotation relative to the positioning pivot on a first plane to form a central area between the two positioning rotation means to place and position a document; and
a connecting pivot formed on a side of the positioning pivot opposite to the two positioning rotation means;
a camera comprising a pivot; and
a foldable supporting means comprising:
a first supporting means connecting to the connecting pivot to perform a rotation to form a first angle between the first supporting means and the first plane;
a second supporting means connecting to the pivot of the camera; and
a third supporting means connecting to the first and the second supporting means;
wherein the first, second and third supporting means stretch along a second plane to form a second angle between the first and the third supporting means and a third angle between the second and the third supporting means, and the camera rotates along a third plane with the pivot to form a fourth angle relative to a stretching direction from the second supporting means to the camera to aim at the document to take a snapshot.

11. The document snapshot device of claim 10, when the first angle is 295 degrees, the second angle is 180 degrees and the third angle is 245 degrees, the third plane is parallel to the first plane.

12. The document snapshot device of claim 11, when the fourth angle is 46 degrees relative to the left side of the stretching direction, the camera precisely aims at the document in the central area.

13. The document snapshot device of claim 10, when the first, second and third supporting means are folded, a containing space is formed between the first and the third supporting means to contain the second supporting means and the camera.

14. The document snapshot device of claim 10, further comprising a cable and a plug for data transmission, wherein the plug is connected to the camera through the cable.

15. The document snapshot device of claim 14, wherein the first and the third supporting means further comprise a first and a second trench respectively to contain the cable and the plug.

16. The document snapshot device of claim 10, the second supporting means further comprises a rotating pivot connecting to the pivot of the camera, the camera performs a rotation with the rotating pivot, wherein the stretching direction of the camera acts as the axis of the rotation.

* * * * *